United States Patent
Cha et al.

(10) Patent No.: US 9,522,649 B2
(45) Date of Patent: Dec. 20, 2016

(54) BUMPER STIFFENER APPARATUS FOR VEHICLE

(71) Applicants: Hyundai Motor Company, Seoul (KR); Kia Motors Corp., Seoul (KR); LG Hausys, Ltd., Seoul (KR)

(72) Inventors: Dong Eun Cha, Suwon-si (KR); Bock Cheol Lee, Suwon-si (KR); Young Sub Oh, Suwon-si (KR); Phil Jung Jeong, Yongin-si (KR); Hyun Gyung Kim, Hwaseong-si (KR); Seung Mok Lee, Osan-si (KR); Sung Jun Hong, Cheongju-si (KR)

(73) Assignees: Hyundai Motor Company, Seoul (KR); Kia Motors Corp., Seoul (KR); LG Hausys, Ltd., Seoul (KR)

( * ) Notice: Subject to any disclaimer, the term of this patent is extended or adjusted under 35 U.S.C. 154(b) by 0 days.

(21) Appl. No.: 14/510,523

(22) Filed: Oct. 9, 2014

(65) Prior Publication Data

US 2015/0367812 A1 Dec. 24, 2015

(30) Foreign Application Priority Data

Jun. 18, 2014 (KR) .................... 10-2014-0074549

(51) Int. Cl.

| | |
|---|---|
| *B60R 21/34* | (2011.01) |
| *B60R 19/12* | (2006.01) |
| *B60R 19/48* | (2006.01) |
| *B60R 19/02* | (2006.01) |
| *B60R 19/38* | (2006.01) |
| *B60R 19/26* | (2006.01) |

(52) U.S. Cl.
CPC .............. *B60R 21/34* (2013.01); *B60R 19/12* (2013.01); *B60R 19/023* (2013.01); *B60R 19/26* (2013.01); *B60R 19/38* (2013.01); *B60R 19/48* (2013.01); *B60R 2021/343* (2013.01)

(58) Field of Classification Search
CPC ........ B60R 21/34; B60R 19/023; B60R 19/26; B60R 19/38; B60R 19/48
USPC ..................... 296/187.04; 293/122, 120, 121
See application file for complete search history.

(56) References Cited

U.S. PATENT DOCUMENTS

| 7,198,309 B2* | 4/2007 | Reynolds ................ B60R 19/18 293/120 |
|---|---|---|
| 7,967,350 B2* | 6/2011 | Ginja ..................... B60R 19/12 188/371 |

FOREIGN PATENT DOCUMENTS

| JP | 10-109664 A | 4/1998 |
|---|---|---|
| JP | 2009-234462 A | 10/2009 |
| KR | 10-2011-0059170 A | 6/2011 |
| KR | 10-2012-0051975 A | 5/2012 |
| KR | 10-2013-0124758 A | 11/2013 |
| KR | 10-2013-0136302 A | 12/2013 |

* cited by examiner

*Primary Examiner* — Joseph D Pape
*Assistant Examiner* — Dana Ivey
(74) *Attorney, Agent, or Firm* — Morgan, Lewis & Bockius LLP

(57) ABSTRACT

A bumper stiffener apparatus for a vehicle may include an upper member connected to a radiator grill, a lower member connected to a bumper below the upper member, a support bar connecting the upper member and the lower member, a hinge mechanism connected to the support bar, and a guide bracket fixed to a back beam arranged on a rear of the lower member to be connected to the hinge mechanism and in which a guide passage is formed for guiding an upward movement of the hinge mechanism when the lower member moves rearward.

10 Claims, 12 Drawing Sheets

… (1)

BUMPER STIFFENER APPARATUS FOR VEHICLE

CROSS-REFERENCE TO RELATED APPLICATION

The present application claims priority to Korean Patent Application No. 10-2014-0074549 filed Jun. 18, 2014, the entire contents of which is incorporated herein for all purposes by this reference.

BACKGROUND OF THE INVENTION

Field of the Invention

The present invention relates to a bumper stiffener apparatus for a vehicle, and more particularly, to a bumper stiffener apparatus for a vehicle, capable of inhibiting the formation of a femoral region malposition of a pedestrian when a vehicle collides with the pedestrian.

Description of Related Art

Generally, a bumper stiffener is arranged between a front bumper and a back beam and serves to protect a pedestrian by absorbing impact energy when a vehicle collides with the pedestrian.

According to a conventional bumper stiffener 1, as shown in FIG. 1, an upper stiffener 1a and a lower stiffener 1b are integrally connected through a connection stiffener 1c based on a back beam 2, and the connection stiffener 1c is fixed to the back beam 2.

Accordingly, a shank below a knee of a pedestrian is supported and protected through the lower stiffener 1b and the femoral region over the knee of the pedestrian is supported and protected through the upper stiffener 1a when a vehicle collides with the pedestrian.

However, according to the related art, the bumper stiffener 1 is arranged to be fixed to the back beam 2 and further the lower stiffener 1b is arranged to be protruded further frontward than the upper stiffener 1a in accordance with a layout of a vehicle so that the upper stiffener 1a cannot efficiently support the femoral region over a knee of a pedestrian when a vehicle collides with the pedestrian thereby forming a malposition at the femoral region of the pedestrian, thereby aggravating the injury to the pedestrian.

That is, in a case where a vehicle installed with the conventional bumper stiffener 1 collides with a pedestrian 3 (A state), as shown in FIG. 2, a shank 3a below a knee of the pedestrian first collides with a bumper of a vehicle (B state) and at this time the lower stiffener 1b supports and protects the shank 3a of the pedestrian.

However, the femoral region 3b over a knee of the pedestrian and the upper stiffener 1a are spaced apart from each other and thus the pedestrian behaves to fall down toward the vehicle (C state), and at this time the femoral region 3b moves toward the vehicle to be mal-positioned (D state). After that, the femoral region 3b becomes in contact with the upper stiffener 1a.

Accordingly, according to the conventional bumper stiffener 1, the upper stiffener 1a does not efficiently support the femoral region 3b of a pedestrian when a vehicle collides with the pedestrian and as a result, the injury to the pedestrian is aggravated.

To solve the above drawbacks, there has been proposed a technology that a radiator grill is rotated and moved frontward by an operation of an actuator that receives signal from a sensor right before a vehicle collides with a pedestrian thereby to support and protect femoral region of the pedestrian when a vehicle collies with the pedestrian, however, the technology needs an expensive sensor, actuator, controller and the like, and thus can be applied to only some of expensive vehicles due to its cost.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a bumper stiffener apparatus for a vehicle, and more particularly, to a bumper stiffener apparatus for a vehicle, capable of inhibiting the formation of a femoral region malposition of a pedestrian when a vehicle collides with the pedestrian.

According to various aspects of the present invention, a bumper stiffener apparatus for a vehicle may include an upper member connected to a radiator grill, a lower member connected to a bumper below the upper member, a support bar connecting the upper member and the lower member, a hinge mechanism connected to the support bar, and a guide bracket fixed to a back beam arranged on a rear of the lower member to be connected to the hinge mechanism and in which a guide passage is formed for guiding an upward movement of the hinge mechanism when the lower member moves rearward.

The upper member and the lower member may be arranged in leftward and rightward directions of a vehicle body in parallel.

Support bars may be arranged on both ends of the upper member and the lower member, respectively.

The hinge mechanism may be disposed at a lower end of the support bar and over the lower member, and may be connected to the support bar, and guide brackets may be arranged on both left and right ends of the back beam to be connected to hinge mechanisms, respectively.

The hinge mechanism may include a hinge bracket fixed to the support bar and a holder portion of the hinge bracket protruded toward the back beam, and a hinge pin inserted into the holder portion and the guide passage and moving along the guide passage when the lower member moves rearward.

The holder portion and the hinge pin may be integrally connected or the hinge pin may be arranged to be rotated within the holder portion.

The guide passage may be formed to be a path through which the hinge pin moves rear-upward when the lower member moves rearward.

The guide passage may further include an extended-passage extended rearward at an upper end of the guide passage and the hinge pin may move up to the extended passage to be fixed to the extended passage when the lower member moves rearward.

A stopper may be arranged between the hinge bracket and the hinge pin and may be inserted into the guide passage when the hinge pin moves upward along the guide passage upward to support the hinge pin to prevent dropping of the hinge pin.

The stopper may be configured such that a bottom surface of the stopper in contact with a bottom of the guide passage, a support surface in contact with the hinge bracket and an inclined surface on which the hinge pin is seated are consecutively connected to form an outline, and the inclined surface is inclined upward from an end of the inclined surface that is in contact with the hinge pin to another end of the inclined surface that is in contact with the support surface.

According to various aspects of the present invention, a bumper stiffener apparatus for a vehicle may include an upper member connected to a radiator grill, a lower member connected to a bumper below the upper member, and a support bar connecting the upper member and the lower member and hinge-connected at a hinge-connection point to a back beam disposed at a rear of the lower member to be rotatable forward and/or rearward, in which the upper end of the support bar rotates forward around the hinge-connection point to the back beam when a vehicle collides with a pedestrian, and the radiator grill protrudes forward when the support bar rotates to support a femoral region of the pedestrian.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
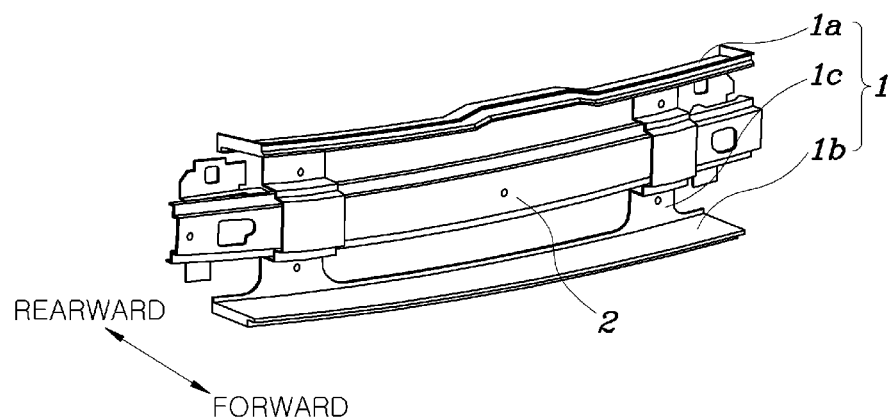
FIG. 1 is a perspective view illustrating a conventional bumper stiffener.
Figure 2A:
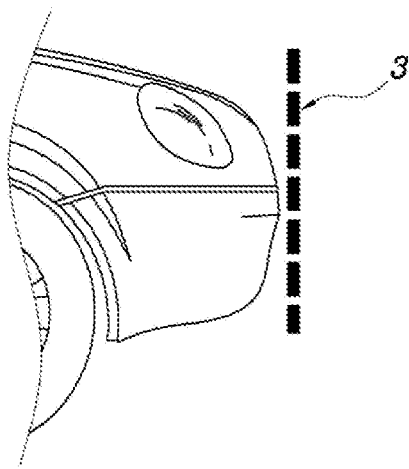
FIG. 2A is a view illustrating behaviors of a pedestrian when a vehicle installed with a conventional bumper stiffener collides with the pedestrian.
Figure 2B:
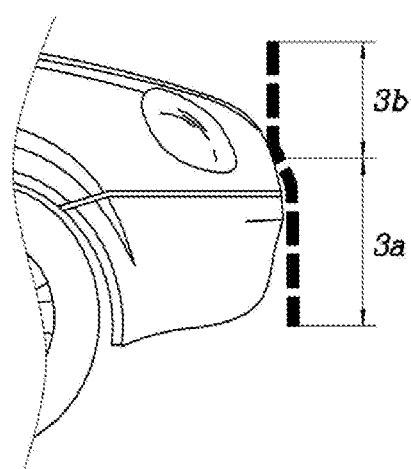
FIG. 2B is a view illustrating behaviors of a pedestrian when a vehicle installed with a conventional bumper stiffener collides with the pedestrian.
Figure 2C:
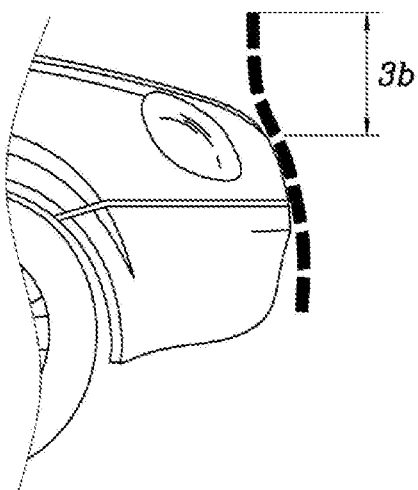
FIG. 2C is a view illustrating behaviors of a pedestrian when a vehicle installed with a conventional bumper stiffener collides with the pedestrian.
Figure 2D:
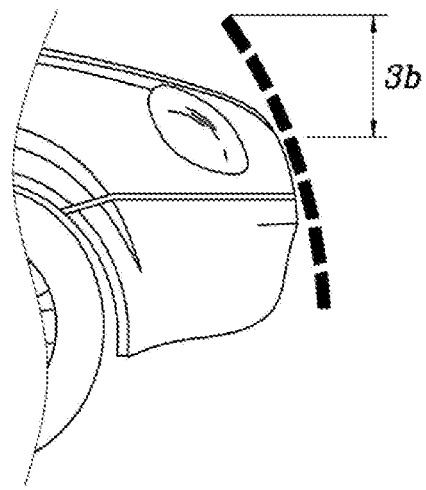
FIG. 2D is a view illustrating behaviors of a pedestrian when a vehicle installed with a conventional bumper stiffener collides with the pedestrian.
Figure 3:
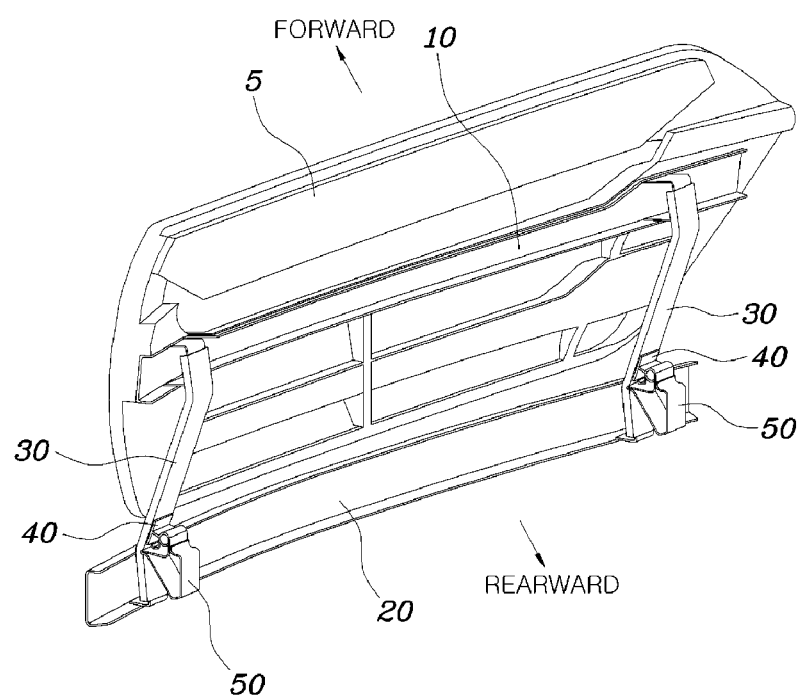
FIG. 3 is a rear-perspective view illustrating an exemplary bumper stiffener according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As shown in FIGS. 3 to 11, a bumper stiffener apparatus for a vehicle according to the various embodiments of the present invention may include an upper member 10 that is connected to a radiator grill 5, a lower member 20 that is connected to a bumper below the upper member 10, a support bar 30 that connects the upper member 10 and the lower member 20, a hinge mechanism 40 that is connected to the support bar 30, and a guide bracket 50 that is fixed to a back beam 7 arranged on a rear of the lower member 20 to be connected to the hinge mechanism 40 and in which a guide passage 51 is formed for guiding an upward movement of the hinge mechanism 40 when the lower member 20 moves rearward.

Here, the upper member 10 and the lower member 20 are arranged in a leftward and rightward direction of a vehicle body to be in parallel in which the upper member 10 is fixed to a rear of a radiator grill 5 and the lower member 20 is fixed to a rear surface of a front member.

Figure 5:
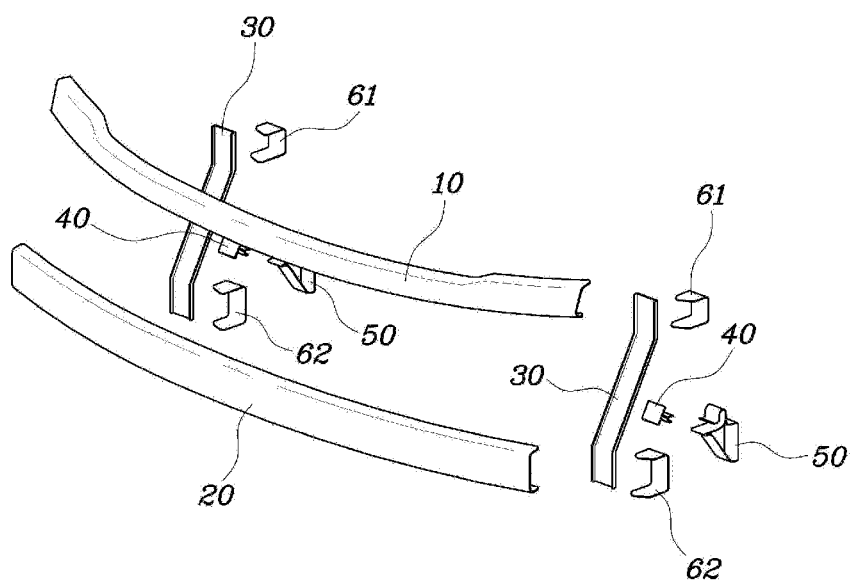
FIG. 5 is an exploded-perspective view illustrating the exemplary bumper stiffener according to the present invention.

Further, the reference numeral 61 illustrated in FIG. 5 indicates an upper mounting bracket that is used when connecting the upper member 10 and the upper end of the support bar 30 and the reference numeral 62 indicates a lower mounting bracket that is used when connecting the lower member 20 and the lower end of the support bar 30.

The support bars 30 are arranged on both ends of the upper member 10 and the lower member 20, respectively, so as to operate the bumper stiffener apparatus according to the present invention, and the hinge mechanism 40 is disposed at a lower end of the support bar 30 and over the lower member 20, and is arranged to be connected to each support bar 30. Further, the guide brackets 50 are arranged on both left and right ends of the back beam 7 to be connected to the hinge mechanisms 40, respectively.

Meanwhile, the hinge mechanism 40 may include a hinge bracket 41 which is fixed to the support bar 30 and a holder portion 41a of which is protruded toward the back beam 7, and a hinge pin 42 that is arranged as a hinge-connection point Hp, to be inserted into the holder portion 41a and the guide passage 51 and moving along the guide passage 51 when the lower member 20 moves rearward.

The holder portion 41a and the hinge pin 42 may be integrally connected or the hinge pin 42 may be arranged to be rotated within the holder portion 41a in which when the holder portion 41a and the hinge pin 42 are integrally connected, the hinge pin 42 moves along the guide passage 51 by being slid, and when the hinge pin 42 is arranged to be rotatable within the holder portion 41a, the hinge pin 42 moves along the guide passage 51 by being slid or being rolling-rotated.

Figure 6:
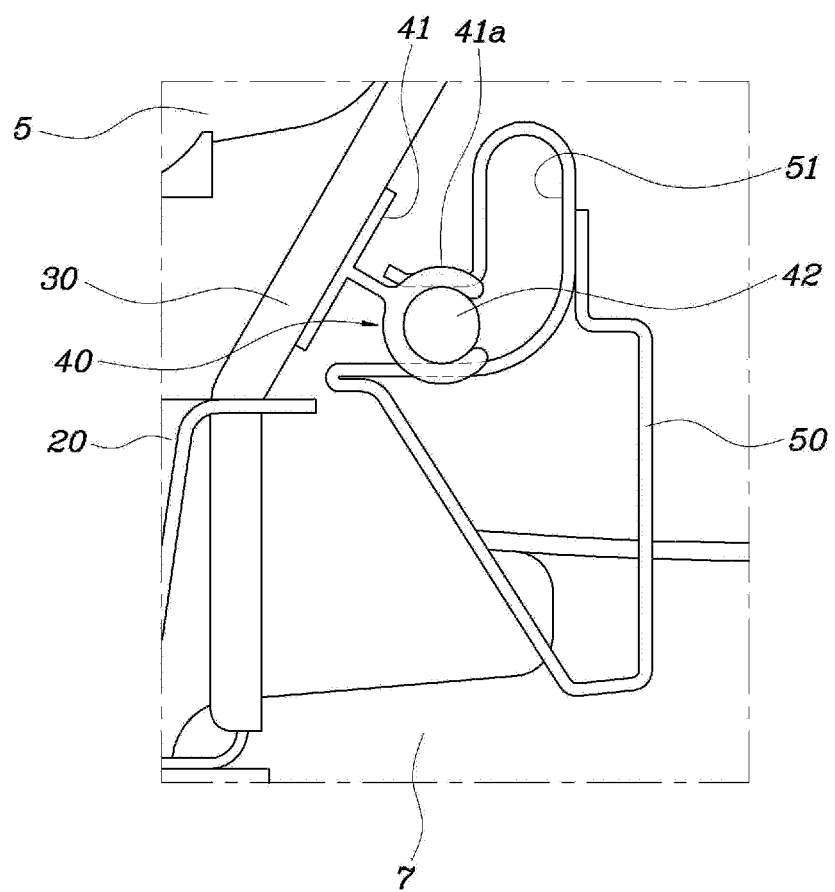
FIG. 6 is an enlarged-view illustrating a portion where a hinge mechanism and a guide bracket are coupled in the exemplary bumper stiffener, according to the present invention.
Figure 8:
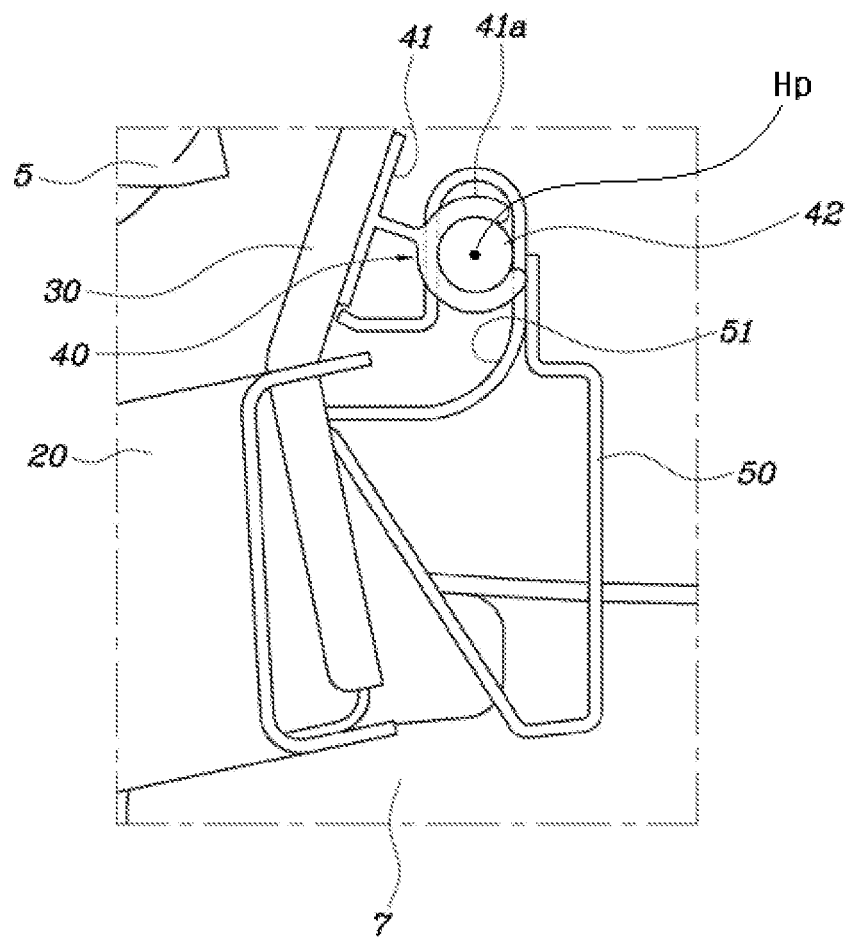
FIG. 8 is an enlarged-view illustrating a portion where a hinge mechanism and a guide bracket are coupled in a state as shown in FIG. 7.

The guide passage 51 is formed to be a passage through which the hinge pin 40 moves rear-upward when the lower member 20 moves rearward due to a collision with a pedestrian, as shown in FIGS. 6 and 8.

When the hinge pin 40 moves along the guide passage 51, the upper end of the support bar 30 is rotated frontward around the hinge pin 40 and as a result, the radiator grill 5 operates to be protruded front-downward.

Here, if the radiator grill 5 is protruded only front-downward, the radiator grill 5 may be highly probable to support a shank below a knee of a pedestrian rather than a femoral region over a knee thereof.

Accordingly, the radiator grill 5 needs to be protruded front-upward when it moves so as to efficiently support the femoral region of a pedestrian and for this purpose, the guide passage 51 becomes a path through which the hinge pin 40 moves rear-upward when the lower member 20 moves rearward.

Figure 9:
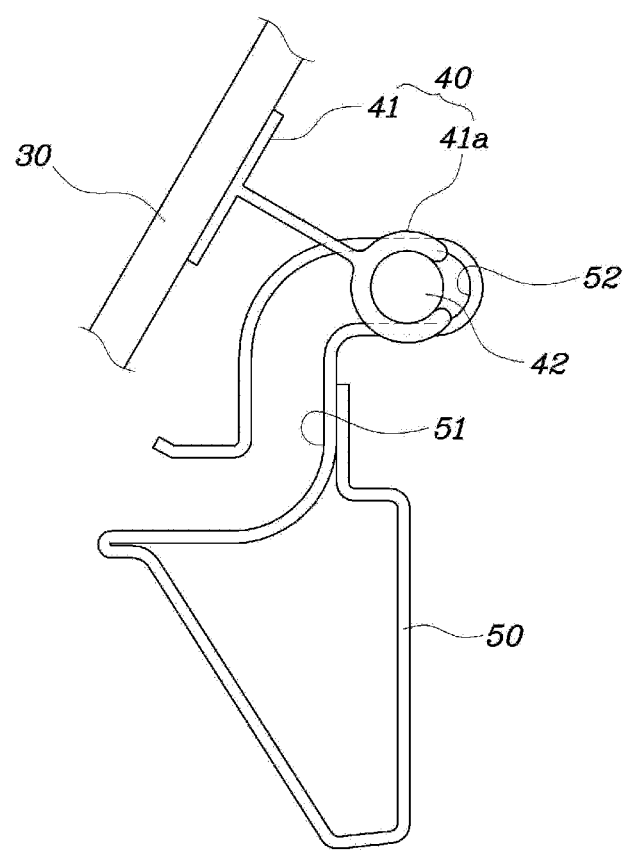
FIG. 9 is a view illustrating an extended passage formed in a guide passage in the exemplary bumper stiffener, according to the present invention.

The guide passage 51 further includes an extended-passage 52 that is extended rearward at an upper end of the guide passage 51, as shown in FIG. 9, and the hinge pin 42 moves up to the extended passage 52 to be fixed thereto when the lower member 20 moves rearward.

Here, in a case where the hinge pin 42 moves along the guide passage 51 only rear-upward, when the impact force generated when the femoral region of a pedestrian contacts the radiator grill 5 is transmitted to the hinge pin, the hinge pin 42 that has moved rear-upward may move to be dropped downward along the guide passage 51, and in this case the radiator grill 5 may not probably support sufficiently the femoral region of a pedestrian. Accordingly, in order to prevent this drawback the extended-passage 52 that is extended rearward from an upper end of the guide passage 51 is further provided and the hinge pin 42 moves up to the extended-passage 52 to be fixed therein when the lower member 20 moves rearward.

When the hinge pin 42 is fixed within the extended-passage 52 as described above, the drop movement of the hinge pin 42 may be prevented and as a result, the radiator grill 5 that is protruded forward may sufficiently support the femoral region of a pedestrian when a vehicle collides with the pedestrian, thereby reducing maximally the injury to the pedestrian.

Figure 10:
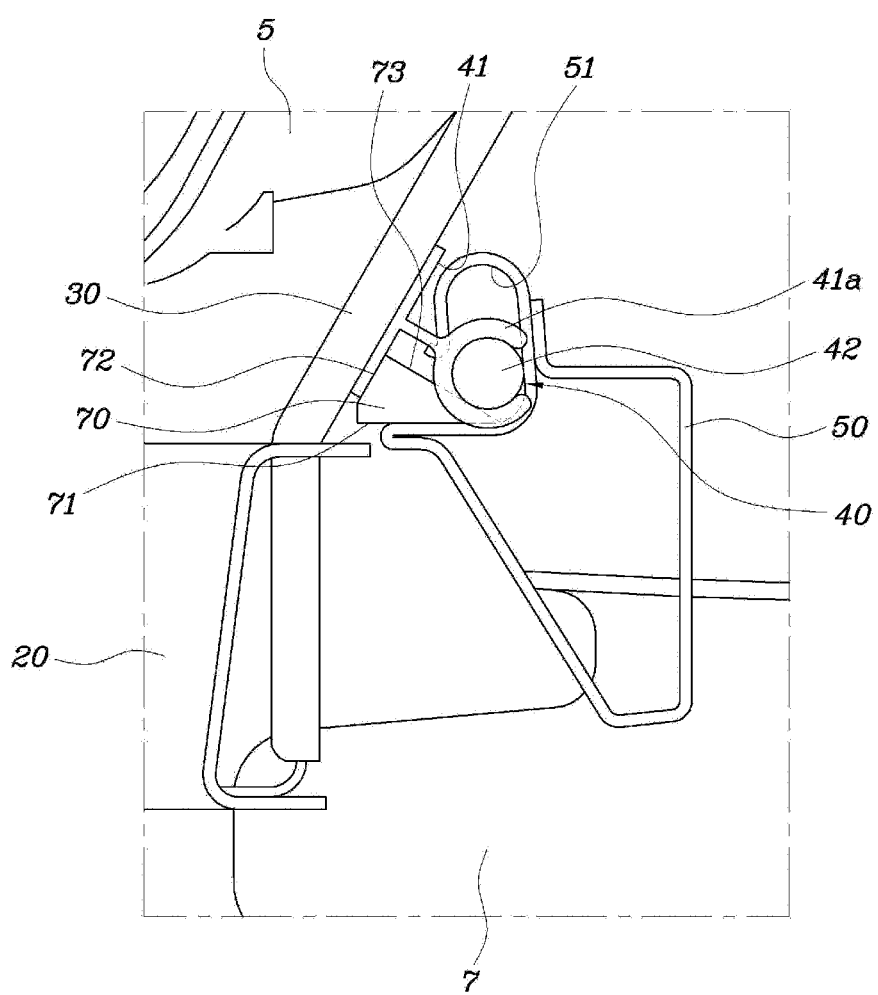
FIG. 10 and FIG. 11 are views illustrating a stopper in the exemplary bumper stiffener according to the present invention.
Figure 11:
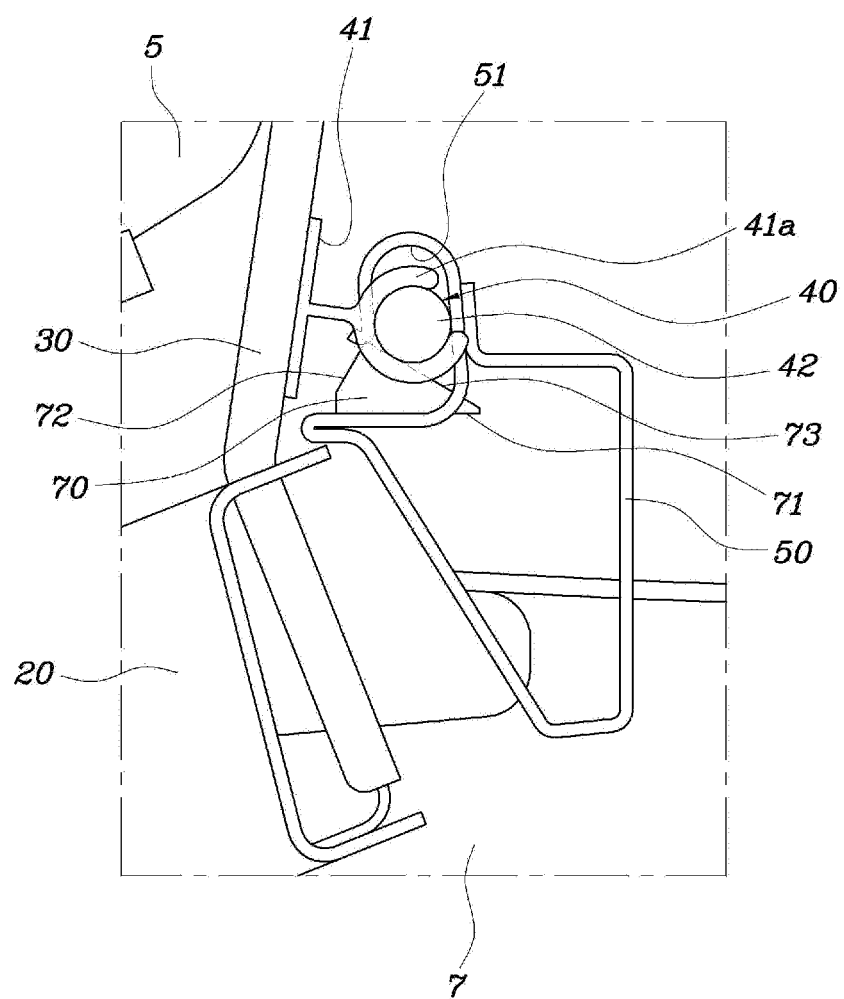

According to various embodiments the present invention so as to prevent the drop movement of the hinge pin 42, as shown in FIGS. 10 and 11, further includes a stopper 70 that is arranged between the hinge bracket 41 and the hinge pin 42 and is inserted into the guide passage 51 when the hinge pin 42 moves along the guide passage 51 upward thereby supporting the hinge pin 42 so as to prevent the drop thereof.

Here, the stopper 70 is configured such that a bottom surface 71 that is in contact with a bottom of the guide passage 51, a support surface 72 that is in contact with the hinge bracket 41 and an inclined surface 73 on which the hinge pin 42 is seated are consecutively connected to form an outline thereof in which the inclined surface 73 is inclined upward from one end that is in contact with the hinge pin 42 to the other end that is in contact with the support surface 72.

Through this shape of the inclined surface 73 as described above the stopper 70 may be easily inserted into a bottom of the hinge pin 42 when the lower member 20 moves rearward due to a collision with a pedestrian, thereby efficiently supporting the hinge pin 42.

Hereinafter, an operation of a bumper stiffener apparatus for a vehicle according to the present invention will be described.

Figure 4:
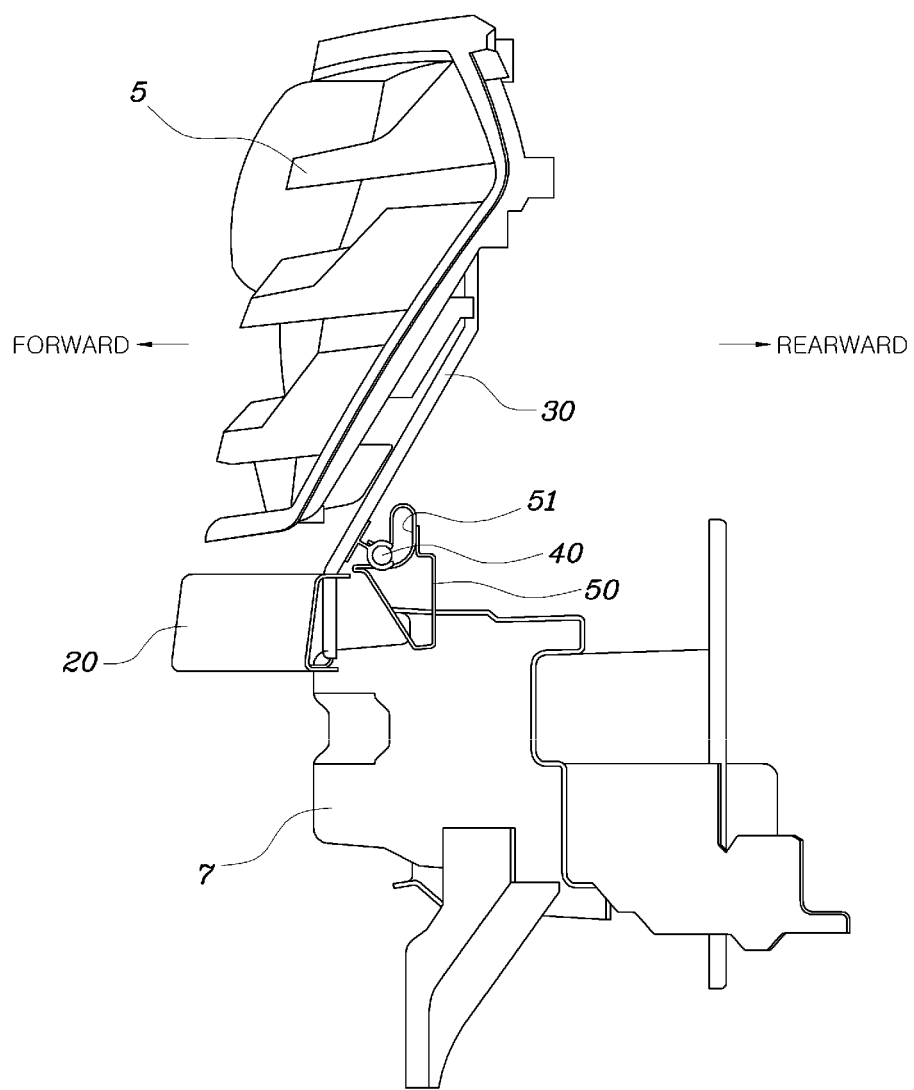
FIG. 4 is a side view illustrating the exemplary bumper stiffener of FIG. 3 according to the present invention.

FIGS. 4 and 6 show a situation before a vehicle collides with a pedestrian in which at this time the lower member 20 is disposed frontward and the hinge pin 42 is disposed at an inlet of the guide passage 51 (left side in FIG. 6).

Figure 7:
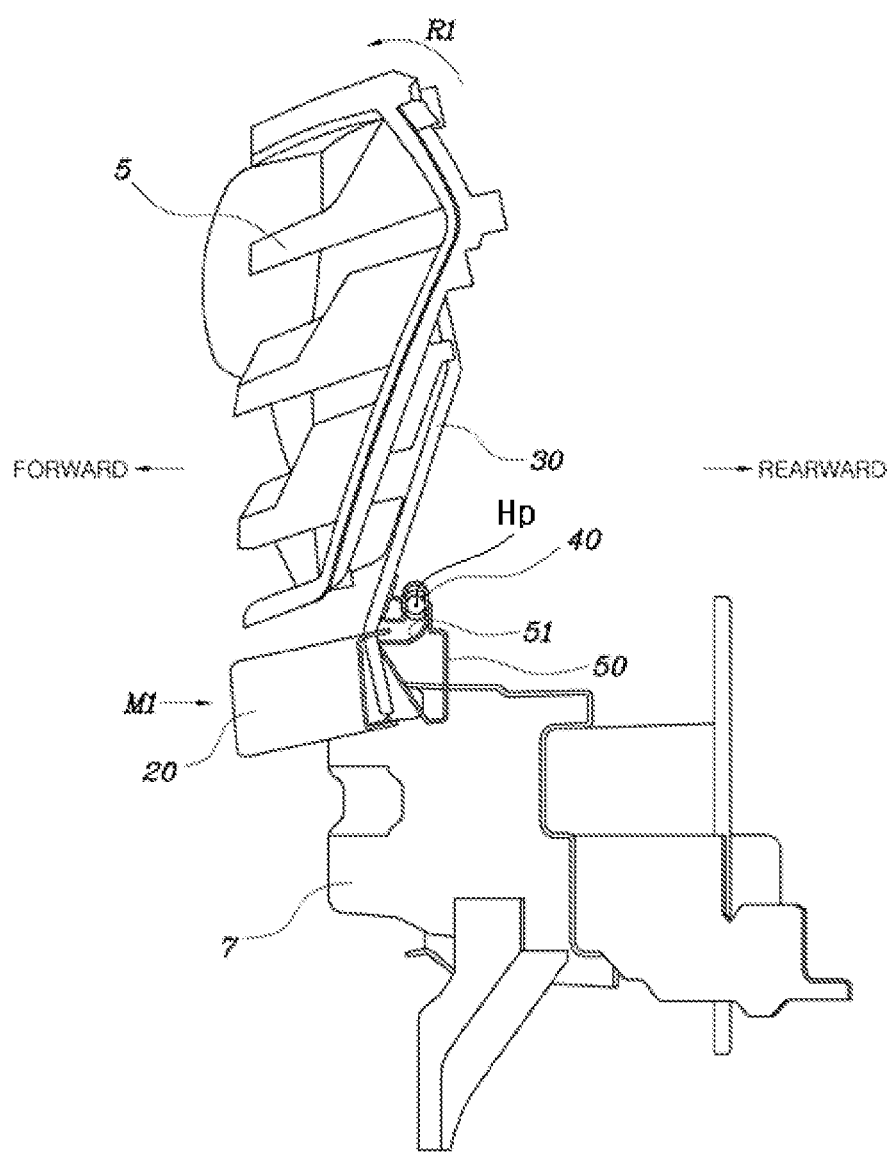
FIG. 7 is a perspective view illustrating a radiator grill that is protruded frontward after a vehicle collides with a pedestrian in the exemplary bumper stiffener according to the present invention.

FIGS. 7 and 8 show a situation when a vehicle collides with a pedestrian in which the shank below a knee of the pedestrian becomes in contact with the lower member 20 through a front bumper when a vehicle collides with a pedestrian, and the lower member 20 absorbs the impact while it moves rearward (indicated as arrow M1 in FIG. 7) in accordance with the contact with the shank of the pedestrian, thereby reducing maximally the injury to the shank of the pedestrian.

Further, the lower end of the support bar 30 moves rearward if the lower member 20 moves rearward and the hinge pin 42 of the hinge mechanism 40 connected to the support bar 30 moves along the guide passage 51 rear-upward.

At this time, the upper end of the support bar 40 rotates forward around the hinge pin 42 to be moved upward and the upper member 10 and the radiator grill 5 connected to the support bar 30 operate to be protruded front-upward (indicated as arrow R1 in FIG. 7).

Accordingly, the femoral region over a knee of a pedestrian is supported sufficiently by the radiator grill 5 while it contacts the radiator grill 5 that is protruded front-upward, thereby preventing malposition of the femoral region of the pedestrian and reducing maximally the injury to the pedestrian.

Meanwhile, when the hinge pin 42 is fixed within the extended-passage 52 that is extended rearward after the hinge pin 42 moves along the guide passage 51 upward, as shown in FIG. 9, or the hinge pin 42 is supported by the stopper 70 while it moves upward, as shown in FIG. 11, the radiator grill 5 can more efficiently support the femoral region of a pedestrian, thereby reducing further the injury to the pedestrian.

According to the bumper stiffener apparatus for a vehicle of the present invention as described above, the femoral region of a pedestrian can be more efficiently supported by the radiator grill 5 that is protruded forward when a vehicle collides with the pedestrian, thereby reducing maximally the injury to the pedestrian.

Further, the bumper stiffener apparatus according to the present invention can reduce the injury to a pedestrian through a simple structure and save cost as compared to a conventional electronic operational device configured by using a sensor for sensing a pedestrian in advance before a vehicle collides with the pedestrian, an actuator for operating a radiator grill, and a controller for controlling the actuator and further it can be applied to all kinds of vehicles such as a light-weight vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bumper stiffener apparatus for a vehicle comprising:
   an upper member connected to a radiator grill;
   a lower member connected to a bumper below the upper member;
   a support bar connecting the upper member and the lower member;
   a hinge mechanism fixed to the support bar; and
   a guide bracket fixed to a back beam arranged on a rear of the lower member and to the hinge mechanism,
   wherein the guide bracket includes a guide passage and the hinge mechanism is engaged to the guide passage and movable along the guide passage, and
   wherein the guide passage guides an upward movement of the hinge mechanism along the guide passage when the lower member moves rearward.

2. The bumper stiffener apparatus for the vehicle of claim 1, wherein the upper member and the lower member are arranged in leftward and rightward directions of the vehicle body in parallel.

3. The bumper stiffener apparatus for the vehicle of claim 1, wherein support bars are arranged on both ends of the upper member and the lower member, respectively.

4. The bumper stiffener apparatus for the vehicle of claim 1, wherein the hinge mechanism is disposed at a lower end of the support bar and over the lower member, and connected to the support bar, and guide brackets are arranged on both left and right ends of the back beam to be connected to hinge mechanisms, respectively.

5. The bumper stiffener apparatus for the vehicle of claim 1, wherein the hinge mechanism comprises:
   a hinge bracket fixed to the support bar and a holder portion of the hinge bracket protruded toward the back beam; and
   a hinge pin inserted into the holder portion and the guide passage and moving along the guide passage when the lower member moves rearward.

6. The bumper stiffener apparatus for the vehicle of claim 5, wherein the holder portion and the hinge pin are integrally connected or the hinge pin is arranged to be rotated within the holder portion.

7. The bumper stiffener apparatus for the vehicle of claim 5, wherein the guide passage is formed to be a path through which the hinge pin moves rear-upward when the lower member moves rearward.

8. The bumper stiffener apparatus for the vehicle of claim 7, wherein the guide passage further comprises an extended-passage extended rearward at an upper end of the guide passage and the hinge pin moves up to the extended passage to be fixed to the extended passage when the lower member moves rearward.

9. The bumper stiffener apparatus for the vehicle of claim 5, further comprising a stopper arranged between the hinge bracket and the hinge pin and inserted into the guide passage when the hinge pin moves upward along the guide passage to support the hinge pin to prevent dropping of the hinge pin.

10. The bumper stiffener apparatus for the vehicle of claim 9, wherein the stopper is configured such that a bottom surface of the stopper in contact with a bottom of the guide passage, a support surface in contact with the hinge bracket and an inclined surface on which the hinge pin is seated are consecutively connected to form an outline, and the inclined surface is inclined upward from an end of the inclined surface that is in contact with the hinge pin to another end of the inclined surface that is in contact with the support surface.

* * * * *